United States Patent
Wu et al.

(10) Patent No.: US 11,668,874 B1
(45) Date of Patent: Jun. 6, 2023

(54) OPTICAL FILTER HAVING A TAPERED PROFILE

(71) Applicant: XILINX, INC., San Jose, CA (US)

(72) Inventors: Zhaoyin Daniel Wu, Los Gatos, CA (US); Chuan Xie, Fremont, CA (US); Mayank Raj, San Jose, CA (US); Parag Upadhyaya, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/700,077

(22) Filed: Mar. 21, 2022

(51) Int. Cl.
*G02B 6/12* (2006.01)
*G02B 6/293* (2006.01)

(52) U.S. Cl.
CPC ....... *G02B 6/12016* (2013.01); *G02B 6/2938* (2013.01); *G02B 6/29338* (2013.01); *G02B 6/29395* (2013.01)

(58) Field of Classification Search
None
See application file for complete search history.

(56) References Cited

U.S. PATENT DOCUMENTS

| | | | |
|---|---|---|---|
| 7,310,459 B1 | 12/2007 | Rahman | |
| 9,520,949 B2 | 12/2016 | Trimberger et al. | |
| 10,598,852 B1 | 3/2020 | Zhao et al. | |
| 10,651,933 B1 | 5/2020 | Chiang et al. | |
| 10,663,658 B2* | 5/2020 | Campanella | G02B 6/12007 |
| 10,862,588 B1 | 12/2020 | Xie | |
| 11,009,771 B1* | 5/2021 | Vidrighin | G02F 1/3536 |
| 11,323,787 B1* | 5/2022 | Leigh | G02B 6/43 |
| 11,340,410 B2* | 5/2022 | Leigh | G02B 6/12007 |
| 2004/0247227 A1* | 12/2004 | Eder | G02B 6/29343 385/11 |
| 2006/0051010 A1* | 3/2006 | Chu | G02B 6/12007 385/5 |
| 2008/0166095 A1* | 7/2008 | Popovic | G02B 6/12007 385/15 |
| 2008/0232409 A1* | 9/2008 | Yamazaki | G02B 6/12004 372/20 |
| 2009/0016738 A1* | 1/2009 | Von Lerber | H04L 7/0075 398/155 |
| 2009/0103863 A1* | 4/2009 | Lee | G02B 6/12007 385/31 |
| 2010/0074444 A1* | 3/2010 | Etemad | H04B 10/85 380/42 |

(Continued)

FOREIGN PATENT DOCUMENTS

| | | |
|---|---|---|
| WO | 2015187586 A1 | 12/2015 |
| WO | 2020256913 A1 | 12/2020 |

*Primary Examiner* — Jerry Rahll
(74) *Attorney, Agent, or Firm* — Patterson + Sheridan, LLP

(57) ABSTRACT

Disclosed herein is an optical filter configured for wavelength division and multiplexing capable of transmitting and receiving signals. The optical filter includes an optical waveguide configured to receive at an input multiple signals with different wavelengths. The optical filter includes a plurality of channels coupled at different locations along a length of the optical waveguide. Each of the plurality of channels is configured to transmit a respective one of the multiple signals. A number of ring filter stages in a first channel of the plurality of channels that is closer to the input of the optical waveguide is greater than a second channel in the plurality of channels further away from the input of the optical waveguide.

20 Claims, 5 Drawing Sheets

(56) References Cited

U.S. PATENT DOCUMENTS

| | | | |
|---|---|---|---|
| 2010/0091990 A1* | 4/2010 | Etemad | H04J 14/005 398/79 |
| 2012/0045163 A1* | 2/2012 | Wu | G02F 1/225 385/2 |
| 2012/0237155 A1* | 9/2012 | Zheng | G02B 6/12007 385/24 |
| 2013/0259747 A1* | 10/2013 | Lee | G01N 21/7746 422/69 |
| 2018/0261983 A1* | 9/2018 | Bovington | H01S 5/5027 |
| 2020/0403706 A1 | 12/2020 | Xie | |
| 2021/0396581 A1* | 12/2021 | Antonacci | G01J 3/0218 |

* cited by examiner

OPTICAL FILTER HAVING A TAPERED PROFILE

BACKGROUND

Technical Field

Examples of the present disclosure generally relate to an optical filter having a tapered profile, and more specifically to a wavelength division and multiplexing scheme in an optical filter for transmitting and receiving signals in an optical circuit.

Description of Related Art

A photonic integrated circuit (IC) utilizes optical communications to provide high speed data transfers, such as about 112 Gbps using PAM4 signaling, between on-chip circuitry. To take advantage of the increased bandwidth afforded by an optical communication medium, the photonic IC may first need to convert input data from the electrical domain to the optical domain. More specifically, an electrical transmitter may generate an electrical signal based on the input data and an electro-optic modulator (EOM) may convert the electrical signal to a corresponding optical signal. The optical signal is then transmitted, over an optical communication medium to an optical receiver, which converts the optical signal back to an electrical signal to recover the input data.

In a wavelength division multiplexing (WDM) system, a plural of optical carriers, equally spaced in frequency or wavelength and each carrying a different channel, are transmitted via a single fiber or optical waveguide. On the receiving end of a WDM system, the optical channels need to be first separated and then directed to separate photodetectors to convert the optical signals back in the electrical domain. The separation of optical channels is called wavelength demultiplexing. The photonics circuit used to demultiplex (demux) optical channels is called the demux filter. One way of demultiplexing the optical channels is to pass the them through a series of bandpass filters called channel drop filters. Ideally, each channel drop filter only directs the intended channel to the corresponding photodetector while rejecting all other channels. Conventionally, the drop filters have identical passband profile; the only difference is the center wavelength, which matches to the respective channel they are designed to drop. If a given filter fails to completely reject signals from adjacent channels in the optical domain, then the unintended signals are output to the electrical domain with interference from the optical domain. As the data propagates through the electrical domain, additional interference or signal degradation can further distort the recovered input data.

Accordingly, there is a need for an improved optical demultiplex filter.

SUMMARY

Disclosed herein is an optical filter having a tapered profile that is configured for wavelength division and multiplexing capable of transmitting and receiving signals in an optical circuit. In one example, the optical filter includes an optical waveguide configured to receive at an input multiple signals with different wavelengths. The optical filter includes a plurality of channels coupled at different locations along a length of the optical waveguide. Each of the plurality of channels is configured to transmit a respective one of the multiple signals. A number of ring filter stages in a first channel of the plurality of channels that is closer to the input of the optical waveguide is greater than a second channel in the plurality of channels further away from the input of the optical waveguide.

In another example, an optical filter includes an optical waveguide configured to receive at an input multiple signals with different wavelengths. The optical filter has a plurality of channels coupled at different locations along a length of the optical waveguide. Each of the plurality of channels is configured to transmit a respective one of the multiple signals. The plurality of channels includes a first channel, a last channel, and one or more intermediate channels disposed between the first channel and the last channel. Among the plurality of channels, the first channel is closest to the input of the optical waveguide and the last channel is furthest from the input of the optical waveguide. A number of ring filter stages in the plurality of channels in the first channel is greater than a last channel.

In yet another example, a method of modulating an optical signal is disclosed. The method includes providing a plurality of micro-ring modulators in a first channel greater than a second channel. A tapered profile of a plurality of channels is formed. The method continues by filtering a multiplexed optical signal through the tapered profile of the plurality of micro-ring modulators.

BRIEF DESCRIPTION OF THE DRAWINGS

So that the manner in which the above-recited features of the present disclosure can be understood in detail, a more particular description of the disclosure, briefly summarized above, may be had by reference to examples, some of which are illustrated in the appended drawings. It is to be noted, however, that the appended drawings illustrate only exemplary examples and are therefore not to be considered limiting of the scope of the disclosure, as the disclosure may admit to other equally effective examples. To facilitate understanding, identical reference numerals have been used, where possible, to designate identical elements that are common to the figures. It is contemplated that elements and features of one example may be beneficially incorporated in other examples without further recitation.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
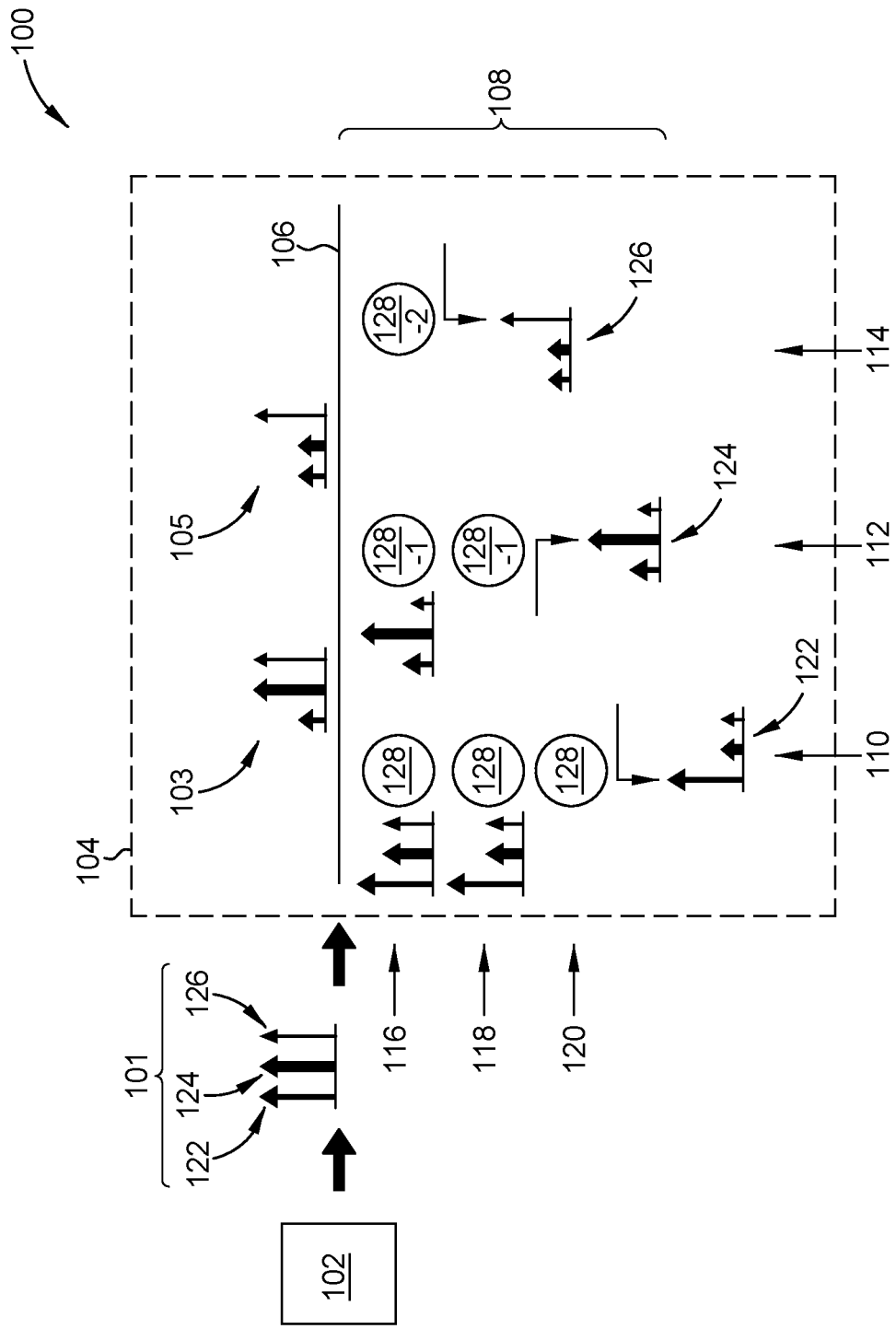
FIG. 1 is a plan view of illustrating an optical system having an optical source that produces a data stream attenuated by an optical filter.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The present disclosure relates to an optical filter with a tapered profile, which is configured for wavelength division and multiplexing capable of transmitting and receiving signals in an optical circuit. Wavelength-division multiplexing (WDM) enables multiple optical signals with different wavelengths to propagate on a shared optical medium, such as a waveguide or fiber optic cable, thereby reducing the number of waveguides needed to achieve a given bandwidth. An optical source provides a data stream in the form of high frequency modulated light signals to the waveguide. The data stream contains multiple independent signals of varying frequencies that have been serialized into a single data stream. The single data stream is then propagated through the waveguide. The optical filter separates, or de-serializes, the data stream into the original independent signals with different frequencies and wavelengths.

Some optical modulation circuits use an array of linearly arranged micro-ring filters (MRFs) in individual channels, each having different resonant frequencies, in order to de-serialize the data stream into the original signals. Each channel of the conventional filter has a same number of MRFs. As the data stream passes by each MRF along the waveguide, a given MRF ideally allows a desired portion of the data stream to pass that matches the resonate frequency of the given WDM channel, while rejecting undesired portions of the data stream in order to obtain the original signals. However, the MRF arrays also enable portions of the undesired signal to pass through all of the MRFs, which is observed as noise on the channel by the given receiver. Removing this noise in the electrical domain traditionally requires additional hardware or additional signal processing in order to obtain a given original signal. For large scale data processing circuits, such as those deployed in next-generation data centers, the data streams processed may exceed one hundred Tera-bits per second (Tbps), thus drastically increasing cost and process time for the additional hardware and/or signal processing.

The optical filter described below includes plural WDM channels that have different numbers of MRFs in a given channel. As such, one or more WDM channels has a plurality of MRFs that are stacked in a direction orthogonal to the waveguide. Additionally, the MRF array that is closest to the optical source has more ring modulators than an MRF arranged furthest away from the optical source. Advantageously, the optical filter more efficiently separates signals in the data stream while in the optical domain, as compared to the conventional optical modulation circuit. In particular, the first channel having the highest number of vertically aligned MRFs allows a first signal to pass through the first MRF of the first channel, while minimizing interference from the other frequency ranges in the data stream.

While noise in the form of undesired signals can pass through the first MRF, the additional MRFs in the first channel further attenuate the undesired signals at each additional stage of the channel in which an MRF is disposed, while permitting the desired signal to pass. In this manner, the optical filter attenuates a greater portion of the undesired signals within the optical filter prior to transmitting the filtered signal to a receiver. Accordingly, data streams utilizing the optical filter disclosed herein require less post-filtering signal processing and less hardware in order to recover the original input signal than photonic circuits that use the same number of MRFs for each channel.

FIG. 1 is a plan view of illustrating an optical system 100 having an optical source 102 that produces a data stream 101. The data stream 101 propagates along a waveguide 106. An optical filter 104 attenuates the data stream 101, and in some examples filters or de-serializes the data stream 101. The optical system 100 is a photonics integrated circuit (IC), in one example. The optical system 100 includes the optical source 102 and an optical filter 104. The optical filter 104 includes a plurality of channels 108 and a waveguide 106. The optical source 102 produces a data stream 101 that is propagated along the waveguide 106, along the direction of arrows, as shown. The optical filter 104 filters out individual signals in the data stream 101, as explained below. In some example, the waveguide 106 can be one or more optical fibers, a silicon waveguide, or other optical media. In one example, the optical source 102 is a laser or an optical fiber optically coupled to a photonic IC.

The plurality of channels 108 include a first channel 110, one or more intermediate channel(s) 112, and a last channel 114. Several intermediate channels 112 may exist between the first channel 110 and the last channel 114. In at least one example, a gap or distance can exist between the waveguide 106 and each MRF 128 in a first stage 116 of the plurality of channels 108. The MRFs 128 in each channel 110, 112, 114 can be separated by another gap that is smaller than the gap between the waveguide 106 and each MRF 128 disposed in the first stage 116.

The first channel 110 is closest to the optical source 102. The first channel 110 has an MRF 128 disposed in a first stage 116, second stage 118, and a third stage 120 for a total of 3 MRFs 128 in the first channel 110. The first stage 116 is closer to the waveguide 106 than the second stage 118 and the third stage 120. Third stage 120 is furthest from the waveguide 106, and the second stage 118 is disposed between the first stage 116 and the third stage 120.

The one or more intermediate channel(s) 112 has one MRF 128-1 disposed in the first stage 116, and one MRF 128-1 disposed in the second stage 118, totaling 2 MRFs 128-1 in the intermediate channel 112. The one or more intermediate channel(s) 112 is disposed between the first channel 110 and the last channel 114.

The last channel 114 is furthest from the optical source 102. Only one MRF 128-2 is disposed in the first stage 116 of the last channel 114. Accordingly, the plurality of channels 108 are sloped or tapered, having a greatest number of MRFs 128 closest to the optical source 102 and only one MRF 128 furthest away from the optical source 102. As such, the last channel 114 has the fewest number of MRFs 128 compared to the first channel 110 and intermediate channel 112. As such, the plurality of channels 108 has a negative slope in the direction of data stream 101 propagation. As shown, the data stream 101 propagates away from the optical source 102 along the waveguide 106, and may continue beyond the last channel 114 and outside of the optical filter 104. Therefore, the slope of the greatest number of MRFs 128 is in the first channel 110 and slopes negatively toward the last channel 114, because the last channel 114 is furthest from the source of the data stream 101, i.e., the optical source 102. Naturally, the plurality of channels 108 has a positive slope in a direction opposite the data stream 101 propagation.

In some example, the MRF 128 has a circumference that is different than each of the circumferences of MRF 128-1 and MRF 128-2. In addition, the MRF 128-1 has a circumference that is different the circumference of the MRF 128-2. A channel with a greater number of MRFs will filter signals from the data stream 101 with shorter wavelengths compared to channels with fewer MRFs. In addition, the circumference of the MRF corresponds to the wavelength of the signal filtered from the data stream 101, such that as the magnitude (i.e., size) of the circumference increases, the magnitude of the wavelength of the filtered signal in the data stream 101 also increases.

The data stream 101 includes a plurality of signals, each signal resonating at a different frequency. For simplicity, the plurality of signals in the data stream 101 is shown having a first signal 122, one or more intermediate signal(s) 124, and a last signal 126, each signal 122, 124, 126 having a different frequency and wavelength. However, it is understood that the data stream 101 output from the optical source 102 can include many more signals (i.e., 32 frequencies or signals), In at least one example, data stream 101 can have one or more wavelengths in in the O-band wavelength (about 1310 nm), having a channel spacing of about 65 GHz. The channel spacing is set to avoid cross-talk and other interference between adjacent channels.

As the data stream 101 propagates through the waveguide 106, passing by the first channel 110, the first signal 122 enters the first channel 110, and the data stream 101 continues throughout the waveguide 106 with the first signal 122 greatly attenuated, and the intermediate signal 124 and the last signal 126 only partially attenuated, as shown at position 103. One of ordinary skill in the art would understand that a greater portion of the intermediate signal 124 and last signal 126 are slightly attenuated, because a lesser portion of the signals 124, 126 may also enter the first channel 110.

The MRFs 128 in the first channel 110 have a resonate frequency that matches the frequency of the first signal 122, thus enabling the first signal 122 to enter the first channel 110. As noted, a lesser portion of the signals 124, 126 can also enter the first channel 110. In some examples, the frequency of the first signal 122, intermediate signal 124, and last signal 126 may have close frequencies, only differing by about 260 Hz. The closeness of frequencies in the data stream 101 enables a portion of the signals 124, 126 to enter the first channel 110.

When encountering the MRF 128 in the first stage 116, in this embodiment, the data stream 101 enters the first channel 110 proximate the waveguide 106 with a clockwise rotation, naturally attenuating the signals 124, 126 and allowing the first signal 122 to propagate through the first channel 110. The data stream 101 enters the MRF 128 in the second stage 118 with a counter-clockwise rotation, enabling the first signal 122 to pass and further attenuating the signals 124, 126, as illustrated. When entering the MRF 128 in the third stage 120, the data stream 101 resumes a clockwise rotation around the circumference of the MRF 128, attenuating the signals 124, 126 even further, while allowing the first signal 122 to pass through the optical filter 104, The last signal 126 and the intermediate signal 124 each have a different frequency than the first signal 122, and the signals 124, 126 are filtered by the MRF 128 in each of the first stage 116, second stage 118, and third stage 120. Accordingly, the first channel 110 enables the first signal 122 to be output from the MRF 128 in the third stage 120 while greatly attenuating the intermediate signal 124 and the last signal 126, as compared to the other optical modulation circuits which have only one MRF in the first channel.

It is understood that clockwise and counter-clockwise are relative terms that are based upon the position of the waveguide 106, the direction of data stream 101 propagation, and a position of the plurality of channels 108 with respect to the waveguide 106. When the data stream 101 propagates along the waveguide 106 and the plurality of channels are positioned below the waveguide 106, as shown in FIG. 1, a clockwise, and counter-clockwise rotation can be defined. Other orientations are contemplated however, such that a clockwise rotation can also be understood to be as starting from the top of the MRF 128 in the first channel 110 and proceeding along the outer circumference of the MRF 128 in the direction of data stream 101 propagation, and then proceeding around the circumference of the MRF 128 in a direction opposite to the direction of propagation of the data stream 101, returning back toward the waveguide 106.

As illustrated, the data stream 101 continues along the waveguide 106 to propagate pass the one or more intermediate channel(s) 112, enabling the intermediate signal 124 to pass through the intermediate channel 112. The MRFs 128 in the intermediate channels 112 have a resonate frequency that matches the frequency of the intermediate signal 124. As similarly demonstrated above with respect to the first signal 122, the intermediate signal 124 enters the MRF 128 of the intermediate channel 112 proximate the waveguide 106 with a clockwise rotation. The first signal 122 and the last signal 126 each have a different frequency than the intermediate signal 124, and the signals 122, 126 are filtered by the MRF 128 in the first stage 116. Because the filtering of the signals by a given MRF 128 is not perfect, the first signal 122 and the last signal 126 pass through the first stage 116 in an attenuated manner.

At the second stage 118 of the intermediate channel 112, the intermediate signal 124 is allowed to pass through the MRF 128 of the second stage 118. The intermediate signal 124 enters MRF 128 of the second stage 118 in a counter-clockwise manner. A lesser portion of the first signal 122 and the last signal 126 also enter MRF 128 of the second stage 118 and are further attenuated at the second stage 118, because the resonate frequency of the MRFs 128 in the intermediate channel 112 do not match the frequencies of the first signal 122 and last signal 126. As such, the intermediate channel 112 enables the intermediate signal 124 to be output from the MRF 128 in the second stage 118 while greatly attenuating the first signal 122 and the last signal 126, as compared to the conventional optical modulation circuit.

As shown at position 105, the data stream 101 continues along the waveguide 106 and proceeds pass the intermediate channel 112 having attenuated portions of the first signal 122 and the intermediate signal 124. At position 105, a majority of the first signal 122 has been transmitted through the first channel 110, and a majority of the intermediate signal 124 has been transmitted through the intermediate channel 112. As such, the last channel 114 is configured to receive the last signal 126, as the MRF 128 in the last channel 114 has a resonate frequency that is the same as the frequency of the last signal 126.

Because the first signal 122 and the intermediate signal 124 are attenuated in the data stream 101 at position 105, the last channel 114 only requires the first stage 116 to filter out the signals 122, 124. The data stream 101 exits the waveguide 106 and enters the MRF 128 of the last channel 114 in a clockwise direction. As the MRF 128 of the last channel 114 has a resonate frequency that is the same as the frequency of the last signal 126, the last signal 126 exits the last channel 114 in the first stage 116. Attenuated portions of the first signal 122 and intermediate signal 124 can also exit the last channel 114. However, as compared to the conventional optical modulation circuit, the noise present in the last signal 126 is greatly reduced, the noise including smaller portions of first signal 122 and intermediate signal 124.

As noted above, the data stream 101 can include as many as thirty-two (32) frequencies. Accordingly, where there are X number of frequencies or signals in the data stream 101, there are Y number of channels, and as many as N stages per channel Y. The number of channels Y corresponds to the number of individual signals in the data stream 101, therefore Y is less than or equal to X. The number of stages N corresponds to the number of MRFs 128 in a given channel. The number of channels N is less than or equal to the number of frequencies X. For example, where there are 32 frequencies X in the data stream 101, Y=32, resulting in 32 channels, each channel corresponding to a given frequency X. When N=32, there are 32 MRFs 128 are arranged in the first channel 110. However, in another example, the number of channels N may be less than 32, such that N can equal 31, or N can equal 30, resulting in between 31 or 32 MRFs 128 in the first channel 110. The first channel 110 will have the highest number of stages N compared to the remaining channels 112, 114.

Continuing with the example above, the number of channels N=1 in the last channel 114 for all individual signals Y greater than or equal to 2. In the one or more intermediate channel(s) 112, the number of stages N is greater or equal to the number of MRFs 128 in the last channel 114, where one (1) MRF is disposed in the last channel 114. In one example, the number of stages N decreases linearly by Y−1 in the direction of propagation of the data stream 101. In this manner, the overall slope of the plurality of channels 108 is linear and negative. For example, where the number of individual signals Y=32, the number of stages N equals 31 in a first one of thirty (30) intermediate channels 112. The number of stages N equals 29 in a second one of the thirty (30) intermediate channels 112 that is adjacent to the first one of the intermediate channels 112. As noted, the number of stages N linearly decreases by Y−1, until a last one of the intermediate channels 112 where the number of stages N=2.

In another example, where there are N number of stages in the first channel 110, the slope of the plurality of channels can decrease non-linearly. For example, the first channel 110 can have a number of stages N=32. The first one of the intermediate channels 112 that is adjacent to the first channel 110 has a number of stages N equal to Y−2, and the adjacent second intermediate channel 112 can have a number of stages N equal to Y−5. The remaining intermediate channels 112 can also decrease non-linearly until the intermediate channel 112 adjacent to the last channel 114 has N number of stages that is equal to or greater than the one (1).

In yet another example, where there are N number of stages in the first channel 110, the slope of the plurality of channels 108 can decrease in a stepped manner. Again, in this example, the first channel 110 can have a number of stages N=32. In this example, the first one of the intermediate channels 112 proximate the first channel 110 can have a number of channels N equal to Y−2. A second intermediate channel 112 adjacent to the first channel 111 can have a number of channels N equal to Y−4. In this example, each adjacent decreases by two (2) MRFs 128 in the intermediate channels 112.

In another implementation of the stepped slope of the plurality of channels 108, adjacent intermediate channels 112 can have a same number of MRFs 128. In this example, a first two intermediate channels 112 can have a number of channels N equal to Y−2. An adjacent group of intermediate channels 112 can have a number of channels N equal to Y−4. In this manner, the first channel 110 has 32 stages N, the next two adjacent intermediate channels 112 have 30 stages N, and the next two adjacent intermediate channels 112 have 28 stages N.

Noting yet another implantation, the examples above may be combined such that the first 3 intermediate channels 112 could be linearly, non-linearly, or have a stepped sloped, and a remaining intermediate channels 112 may have one or more stages N. It is understood that the implementations disclosed above are exemplary, and other examples are contemplated without departing from the scope of the disclosure.

Figure 2:
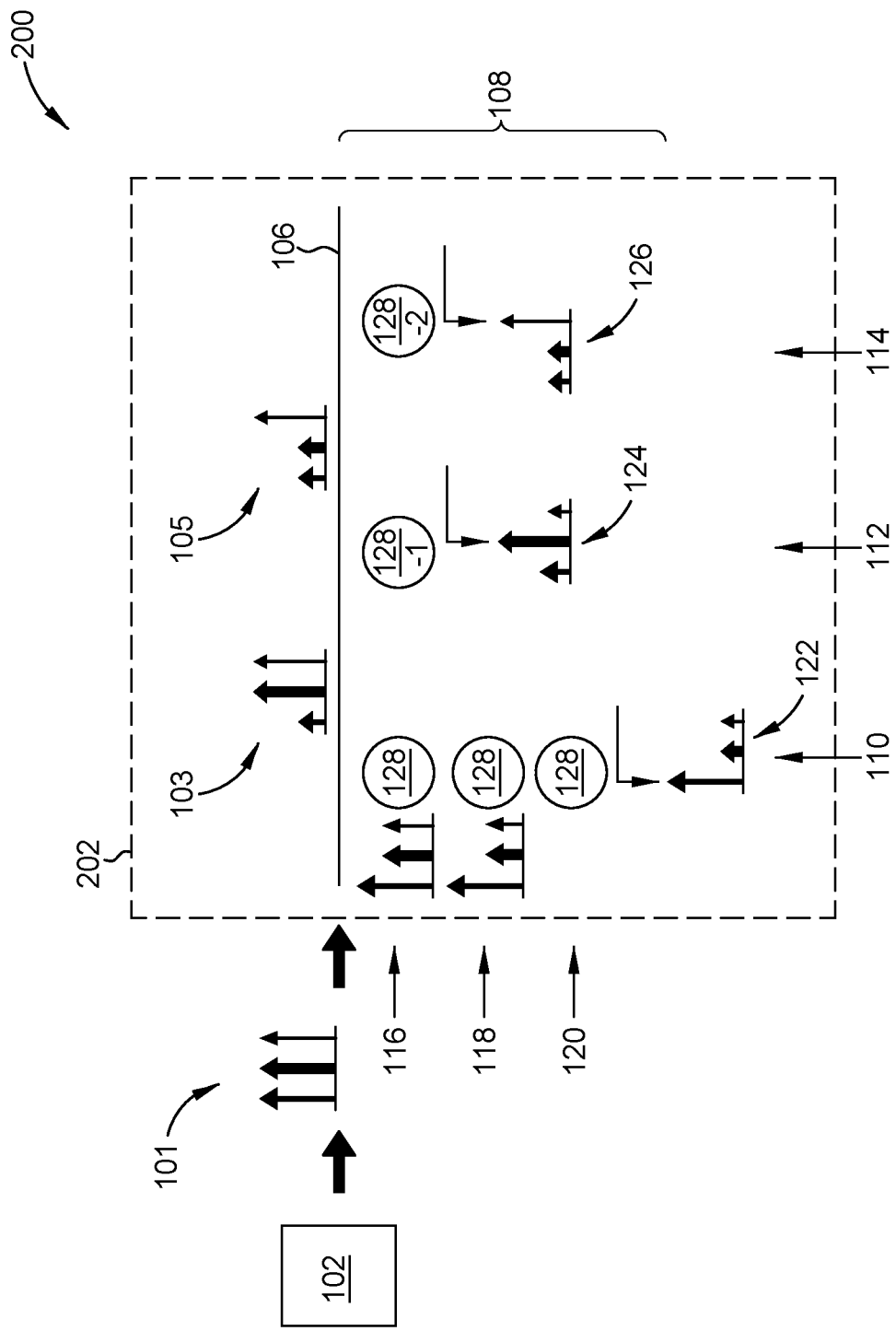
FIG. 2 is a plan view of another optical system having another optical filter, similar to the optical filter shown in FIG. 1.

FIG. 2 is a plan view of another optical system 200 having another optical filter 202, similar to the optical filter 104 shown in FIG. 1. An optical system 200 includes the optical source 102 and an optical filter 202. The optical filter 202 in FIG. 2 is substantially the same as the optical filter 104 shown in FIG. 1, with the exception of the intermediate channel 112.

The intermediate channel 112 has a single MRF 128 disposed in the first stage 116. The data stream 101 enters the intermediate channel 112 from the waveguide 106. The MRF 128 of the intermediate channel 112 allows the intermediate signal 124 to pass, while filtering out the first signal 122 and the last signal 126. As such, the intermediate channel 112 enables intermediate signal 124 to exit the intermediate channel 112, because the MRF 128 in the intermediate channel 112 has a resonate frequency that matches the frequency of the intermediate signal 124. The slope of the plurality of the channels 108 remains negative in the direction of propagation of the data stream 101, and also in the direction proceeding away from the optical source 102. Similar to the optical system 100 shown in FIG. 1, the optical system 200 of FIG. 2 shows that each successive channel along the waveguide 106, in the direction of data stream 101 propagation, has no more stages N than a previous channel. Stated differently, the plurality of channels 108 is sloped. The last channel has a lower number of stages N (i.e., a first stage 116) than the first channel 110, which has three stages, i.e., the first stage 116, second stage 118, and third stage 120.

Figure 3:
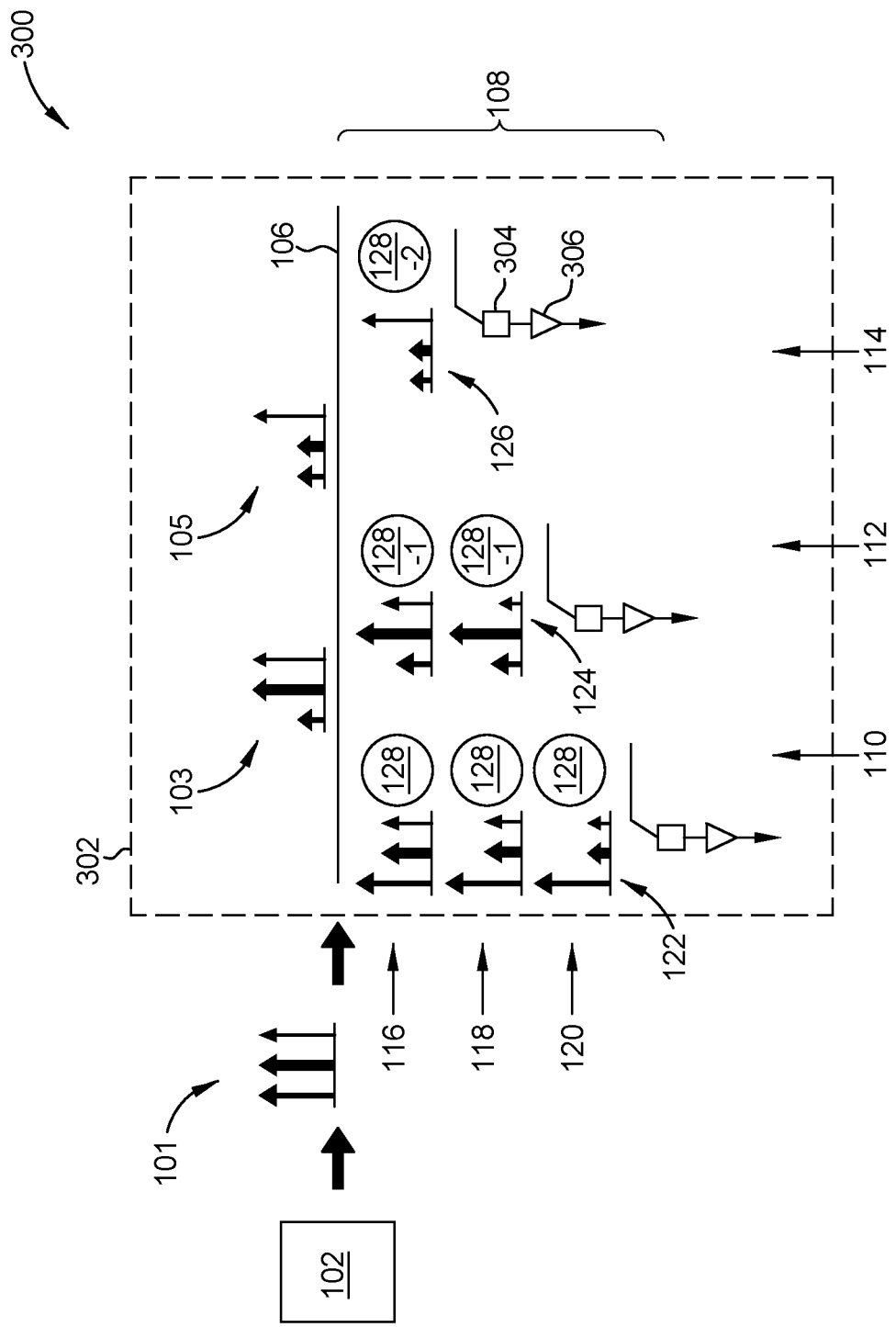
FIG. 3 is a plan view of another optical system having yet another optical filter that is coupled to plural integrated circuit IC receivers.

FIG. 3 is a plan view of an optical system 300 having an optical source 102 and an optical filter 302 that is coupled to plural integrated circuit (IC) receivers 306. Each IC receiver 306 is disposed within each of the first channel 110, intermediate channel 112, and the last channel 114.

A photodiode 304 is disposed in the third stage 120 between the IC receiver 306 and the MRF 128 in the first channel 110. Similarly, a photodiode 304 is disposed in the intermediate channel 112 between the MRF 128 in the second stage 118 and the photodiode 304. The photodiode 304 in the last channel 114 is likewise disposed between the MRF 128 in the first stage 116 and the IC receiver 306. Any suitable photodiode may be used as the photodiode 304, including but not limited to an avalanche photodiode (APD). Each photodiode 304 is configured to convert a received optical signal (e.g., first signal 122, intermediate signal 124, last signal 126) to a corresponding electrical data signal. The electrical data signal is transmitted to the IC receiver 306. In some example, the IC receiver 306 may include one or more buffers (not shown), which may buffer the signals 122, 124, 126 in their respective channels 110, 112, 114 prior to transmitting the signals 122, 124, 126 outside of the optical system 300.

Figure 4:
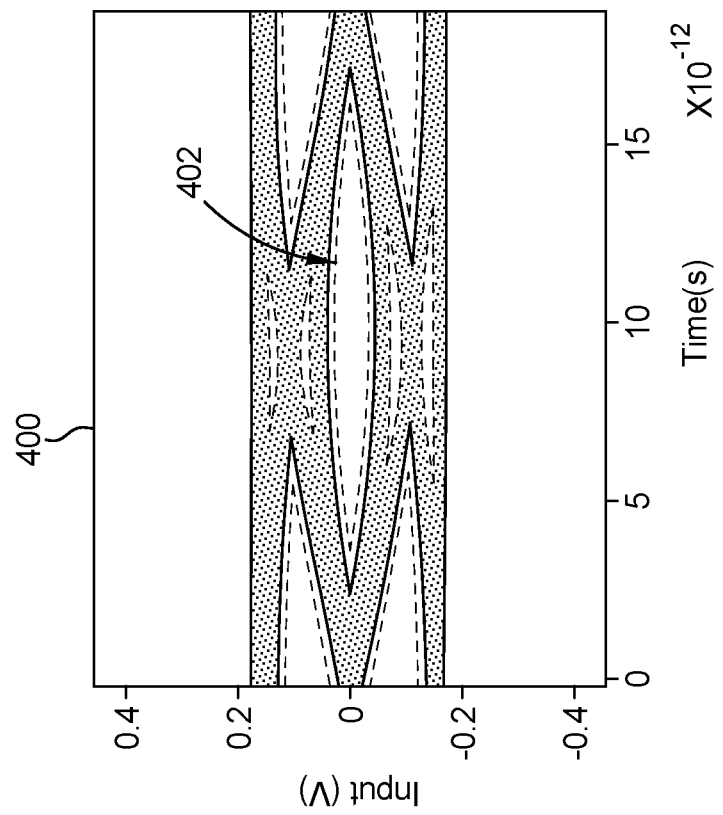
FIG. 4 shows a graph of a voltage output over time from a first channel of any one of the optical filters shown in FIGS. 1-3.
Figure 4:
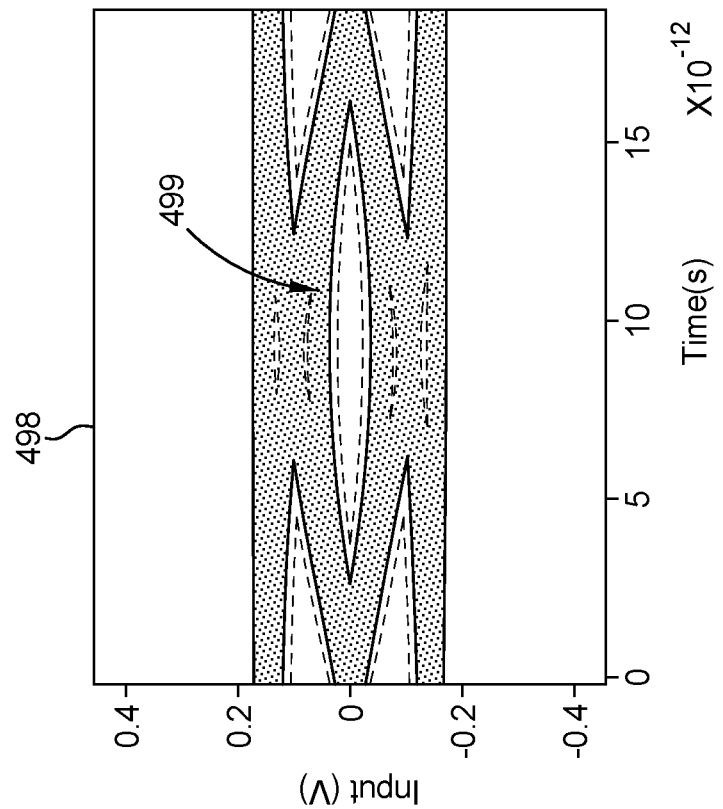

FIG. 4 shows a graph 400 of a voltage output over time from a first channel 110 of any one of the optical filters 104, 202, 302 shown in FIGS. 1-3. The graph 400 shows that a middle of the eye 402 of the graph 400 is more open than a middle of the eye 499 of the graph 498 of an optical modulation circuit using a single MRF in each channel. Accordingly, the optical filters 104, 202, 302 disclosed herein, improve filtering of a desired optical signal in each channel 110, 112, 114 while greatly reducing noise in each channel 110, 112, 114 contributed from undesired signals compared to the conventional apparatus, as shown in graph 498.

Figure 5:
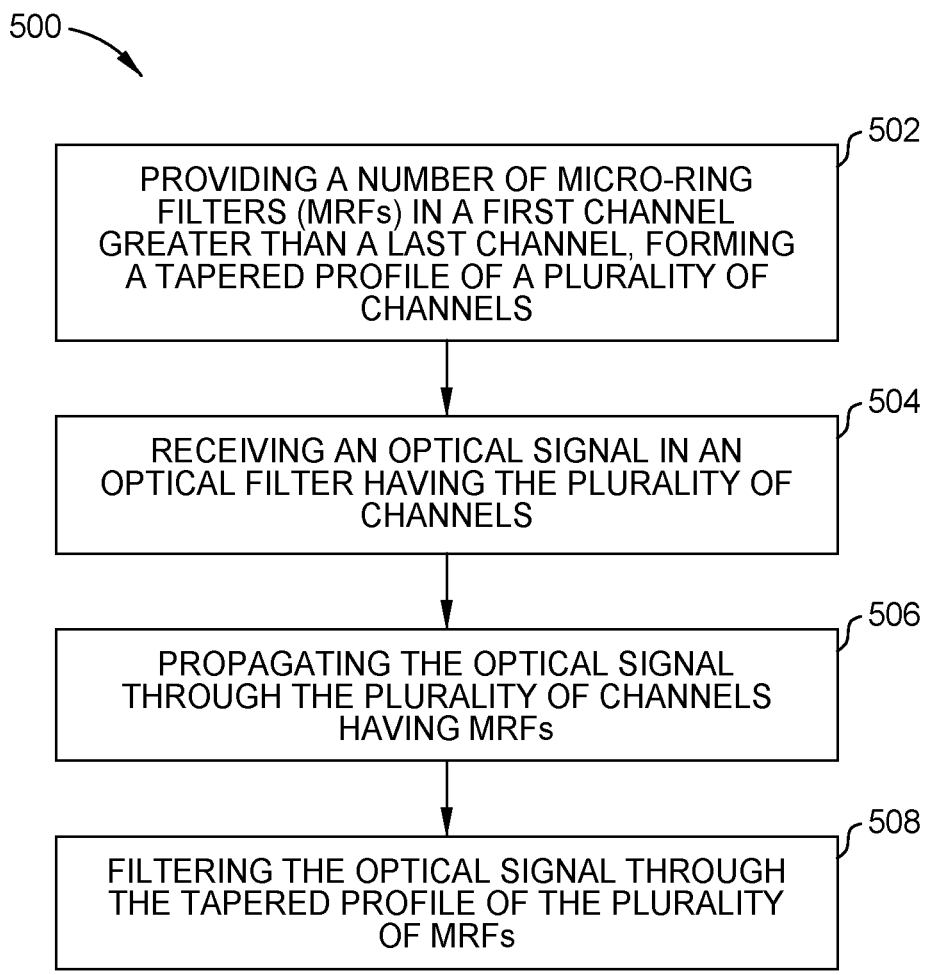
FIG. 5 is a flow chart of a method of filtering a data stream with any one of the preceding optical filters illustrated in FIGS. 1-3.

FIG. 5 is a flow chart of a method 500 of filtering a data stream with any one of the preceding optical filters. The method 500 begins at operation 502 by setting a number of micro-ring modulators in a first channel greater than a last channel, thereby forming a tapered profile of a plurality of channels N 108. Accordingly, a number of optical filter channels N is set. As shown in FIG. 1, the first channel 110 has an MRF 128 disposed in the first stage 116, second stage 118, and third stage 120 of the first channel 110, such that the first channel 110 has three (3) channels N. Only one MRF 128 is disposed in first stage 116 of the last channel 114, such that one (1) MRF 128 is contained in the last channel 114, which has only one (1) channel N. The one or more intermediate channel(s) 112 have at least one (1) MRF 128 disposed in the first stage 116, as shown in FIG. 2. Alternatively, as shown in FIG. 3, the one or more intermediate channel(s) 112 can have an MRF 128 disposed in the first stage 116 and the second stage 118. It is understood that where the discussion of the method 500 references FIG. 1, additional examples can be demonstrated with FIGS. 2 and 3.

The method 500 continues at operation 504, where an optical filter that has a plurality of channels N (e.g., the optical filter shown in FIGS. 1-3) receives a multiplexed optical signal that has multiple signals with different frequencies and wavelengths. For example, in one implementation of the method 500, the optical filter 104 receives a data stream 101 that is output from the optical source 102. The data stream 101 (i.e., the multiplexed optical signal) is propagated along the waveguide 106.

At operation 506, the method 500 proceeds by propagating the optical signal through a plurality of channels 108 in the optical filter. As shown in FIG. 1, and described above, the data stream 101 propagates along the waveguide 106 and the data stream 101 bypasses the first channel 110, intermediate channel(s) 112, and the last channel 114. As noted, the plurality of MRFs 128 are disposed in a plurality of channels 108.

The method 500 continues to operation 508, where the optical filter propagates the data stream through a tapered profile of the plurality of MRFs. The data stream 101 is filtered through the first channel 110, one or more intermediate channel(s), and a last channel 114. As noted, the first channel 110 is closest to the optical source 102, i.e., the original of the optical source 102, and a last channel 114 is furthest from the optical source 102. Accordingly, the data stream 101 enters the first channel 110 prior to entering the one or more intermediate channel(s) 112. The data stream 101 enters the last channel 114 after entering the first channel 110 and intermediate channel(s) 112. As shown, the MRFs 128 in the plurality of channels 108 have a tapered profile.

Disclosed herein is an optical filter having a tapered profile that is configured for wavelength division and multiplexing capable of transmitting and receiving signals in an optical circuit. Advantageously, the optical filters disclosed herein distribute MRFs in the optical filter in a tapered manner, enabling signals to be attenuated one or more times before being transmitted out of a respective channel. In this manner, the optical filter is configured to de-serialize a given data stream while greatly reducing noise from undesired signals in each respective channel. While the foregoing is directed to examples of the present disclosure, other and further examples may be devised without departing from the basic scope thereof, and the scope thereof is determined by the claims that follow.

What we claim is:

1. An optical filter comprising:
   an optical waveguide having an input configured to receive multiple optical signals with different wavelengths; and
   a plurality of channels coupled at different locations along a length of the optical waveguide, wherein each of the plurality of channels is configured to transmit a respective one of the multiple signals, wherein:
   a number of ring filter stages in a first channel of the plurality of channels that is closer to the input of the optical waveguide is greater than a number of ring filter stages in a second channel in the plurality of channels further away from the input of the optical waveguide.

2. The optical filter of claim 1, wherein:
   each successive channel along the optical waveguide has no more ring filter stages than a previous channel along the optical waveguide.

3. The optical filter of claim 2, further comprising:
   an intermediate channel disposed between the first channel and the second channel, the intermediate channel having a number of channels less than the first channel and greater than the second channel.

4. The optical filter of claim 3, wherein the first channel is configured to output a first signal filtered from an optical signal, the first signal configured to exit a last ring filter in the first channel with a first direction of rotation that is opposite of an intermediate direction of rotation of an intermediate signal of the optical signal, the intermediate signal configured to output from a last ring filter in the intermediate channel.

5. The optical filter of claim 2, further comprising:
   an intermediate channel disposed between the first channel and the second channel, the intermediate channel having a number of channels less than the first channel and equal to the second channel.

6. The optical filter of claim 5, wherein the intermediate channel is configured to output an intermediate signal filtered from an optical signal, the intermediate signal configured to exit a ring filter in the intermediate channel with a first direction of rotation that has a same rotation as a second direction of rotation of a last signal of the optical signal, the last signal configured to output from a last ring filter in the second channel.

7. The optical filter of claim 1, wherein:
   each successive channel of the one or more intermediate channels along the optical waveguide has no more ring filter stages than a previous channel along the optical waveguide.

8. The optical filter of claim 1, further comprising:
   a photodetector; and a receiver, wherein the photodetector is disposed between at least one ring filter of the number of ring filter stages and the receiver.

9. The optical filter of claim 1, wherein the first channel is configured to output a first signal filtered from an optical signal, the first signal configured to exit a ring filter in the first channel with a first direction of rotation that is opposite to a second direction of rotation of a last signal of the optical signal, the last signal configured to output from a last ring filter in the second channel.

10. The optical filter of claim 1, further comprising:
a photodetector; and
a receiver, wherein the photodetector is disposed between at least one ring filter of the number of ring filter stages and the receiver.

11. The optical filter of claim 1, wherein the first channel includes a number of micro-ring filters (MRFs) that is greater than a number of MRF filters disposed in the second channel.

12. The optical filter of claim 1, wherein the second channel includes a number of micro-ring filters (MRFs) that is less than or equal to a number of MRF filters disposed in an intermediate channel, the intermediate channel disposed between the first channel and the second channel.

13. The optical filter of claim 12, wherein the intermediate channel has a same number of MRF filters as the second channel.

14. An optical filter comprising:
an optical waveguide having an input configured to receive multiple signals with different wavelengths; and
a plurality of channels coupled at different locations along a length of the optical waveguide, wherein each of the plurality of channels is configured to transmit a respective one of the multiple signals, the plurality of channels comprising:
a first channel;
a second channel; and
one or more intermediate channels disposed between the first channel and the second channel, among the plurality of channels, the first channel is closest to the input of the optical waveguide and the second channel is furthest from the input of the optical waveguide, and wherein:
a number of ring filter stages in the plurality of channels in the first channel is greater than a number of ring filter stages in the second channel.

15. The optical filter of claim 14, further comprising:
at least one intermediate channel of the one or more intermediate channels is disposed between the first channel and the second channel, the intermediate channel having a number of channels less than the first channel and equal to the second channel, and the second channel has a lower number of ring filter stages than the first channel along the optical waveguide.

16. The optical filter of claim 14, wherein the first channel includes a number of micro-ring filters (MRFs) that is greater than a number of MRF filters disposed in the second channel.

17. The optical filter of claim 14, wherein the second channel includes a number of micro-ring filters (MRFs) that is less than or equal to a number of MRF filters disposed in an intermediate channel, the intermediate channel disposed between the first channel and the second channel.

18. The optical filter of claim 14, further comprising:
at least one intermediate channel of the one or more intermediate channels is disposed between the first channel and the second channel, the intermediate channel having a number of channels less than the first channel and greater than the second channel, and the second channel has a lower number of ring filter stages than the first channel along the optical waveguide.

19. The optical filter of claim 18, wherein the first channel is configured to output a first signal filtered from an optical signal, the first signal configured to exit a last ring filter in the first channel with a first direction of rotation that is opposite of an intermediate direction of rotation of an intermediate signal of the optical signal, the intermediate signal configured to output from a last ring filter in the intermediate channel.

20. A method of modulating an optical signal, comprising:
providing a plurality of micro-ring modulators in a first channel greater than a plurality of micro-ring modulators in a second channel; forming a tapered profile of a plurality of channels; and
filtering a multiplexed optical signal through the tapered profile of the plurality of micro-ring modulators.

* * * * *